(12) United States Patent
Lee et al.

(10) Patent No.: US 9,971,924 B2
(45) Date of Patent: May 15, 2018

(54) TWO-SUBSTRATE FINGERPRINT RECOGNITION DEVICE

(71) Applicant: SuperC-Touch Corporation, New Taipei (TW)

(72) Inventors: Hsiang-Yu Lee, New Taipei (TW); Shang Chin, New Taipei (TW); Ping-Tsun Lin, New Taipei (TW)

(73) Assignee: SUPERC-TOUCH CORPORATION, New Taipei (TW)

( * ) Notice: Subject to any disclaimer, the term of this patent is extended or adjusted under 35 U.S.C. 154(b) by 0 days. days.

(21) Appl. No.: 15/238,079

(22) Filed: Aug. 16, 2016

(65) Prior Publication Data
US 2017/0053150 A1 Feb. 23, 2017

(30) Foreign Application Priority Data
Aug. 17, 2015 (TW) .............................. 104126732 A (51) Int. Cl.
*G06K 9/00* (2006.01)
(52) U.S. Cl.
CPC ....... *G06K 9/0002* (2013.01); *G06K 9/00053* (2013.01)
(58) Field of Classification Search
CPC .......................... G06K 9/0002; G06K 9/00053
See application file for complete search history.

(56) References Cited

U.S. PATENT DOCUMENTS

| 6,627,305 | B1* | 9/2003 | Deane | G02F 1/1333 257/E31.041 |
| 8,107,212 | B2* | 1/2012 | Nelson | G06K 9/00053 361/220 |
| 9,058,511 | B2* | 6/2015 | Chou | G06K 9/0002 |
| 9,322,862 | B2* | 4/2016 | Chou | G06F 3/044 |
| 9,478,597 | B2* | 10/2016 | Yamazaki | H01L 27/1225 |
| 2008/0054875 | A1* | 3/2008 | Saito | A61B 5/1172 324/71.5 |
| 2012/0256304 | A1* | 10/2012 | Kaigawa | H01L 27/14645 257/656 |
| 2014/0333328 | A1* | 11/2014 | Nelson | G06F 3/044 324/663 |
| 2015/0347806 | A1* | 12/2015 | Li | H01L 24/17 257/414 |
| 2016/0026846 | A1* | 1/2016 | Lin | G06K 9/0002 382/124 |
| 2017/0053150 | A1* | 2/2017 | Lee | G06K 9/0002 |

* cited by examiner

*Primary Examiner* — Gregory M Desire
(74) *Attorney, Agent, or Firm* — Muncy, Geissler, Olds & Lowe, P.C.

(57) ABSTRACT

A two-substrate fingerprint recognition device includes a first substrate and a second substrate. A plurality of electrodes, a plurality of connection pads and a plurality of connection traces are deployed on one surface of the first substrate. A plurality of conductive connection pads, a plurality of connection pads, a plurality of connection traces and a plurality of switch circuits are deployed on one surface of the second substrate that faces the first substrate. At least one electrode connection pad of the second substrate is electrically connected to a corresponding electrode of the first substrate.

14 Claims, 11 Drawing Sheets

TWO-SUBSTRATE FINGERPRINT RECOGNITION DEVICE

BACKGROUND OF THE INVENTION

1. Field of the Invention

The present invention relates to the technical field of fingerprint recognition devices and, more particularly, to a two-substrate fingerprint recognition device.

2. Description of Related Art

Due to the fingerprint recognition being newly introduced in the application of the smart phones, the fingerprint recognition develops and becomes a popular issue again. As commonly known, there are capacitive fingerprint sensors and optical fingerprint sensors.

Fingerprint recognition sensors can be classified into semiconductor sensors and optical sensors according to their manufacturing processes. The semiconductor sensors are regarded as the fingerprint sensors produced by integrated circuits and semiconductor manufacturing processes. For capacitive semiconductor fingerprint sensors, the capacitance sensors are densely integrated in a chip. When a finger presses the surface of the chip, the capacitance sensors in the chip will produce a fingerprint image according to the amount of charge of the fingerprint, which is various from a peak to a valley of the fingerprint. The newly developed smart phones typically utilize the function of the capacitance sensors.

The capacitive semiconductor fingerprint sensors must have enough pressing area provided with sensing electrodes, which occupies a large area in a chip, resulting in that the production cost of the chip is greatly increased. On the other hand, the chip per se is a bare semiconductor chip. When designing the chip, it is a challenge to consider special package manufacturing processes for isolating the perspiration from the finger, avoiding the acid-base erosion on the surface of the chip, and protection for electrostatic discharge. When using a common protection glass to protect a bare semiconductor chip, since the thickness of the protection glass is about 200~300 μm, the capacitive semiconductor fingerprint sensor chip under the protection glass is difficult to distinguish the small variation of the amount of charge from the peak to the valley of the fingerprint, and thus is difficult to effectively perform fingerprint sensing. To solve the problem, the newly developed smart phones attach a sapphire substrate with a high dielectric constant on the surface of the fingerprint sensor for protection. A sapphire substrate is hard enough, so that the thickness thereof can be reduced to be smaller than that of a protection glass, thereby solving the problem of the low efficiency of the conventional capacitance sensor. However, a sapphire substrate is not satisfactory to the users as it is much more expensive than a common protection glass. Thus, it is desired to provide an improved fingerprint recognition device so as to mitigate or alleviate the aforementioned problems.

SUMMARY OF THE INVENTION

The propose of the present invention is to provide a two-substrate fingerprint recognition device, which can improve the sensing sensitivity and the signal-to-noise ratio, and enhance the stability and the accuracy without having to use a sapphire substrate for protection. On the other hand, the two-substrate fingerprint recognition device can be integrated into a prior touch display panel by existent touch display panel manufacturing process. Therefore, it is unnecessary to produce the sensing electrodes with an expensive integrated circuit, so that the cost of the fingerprint recognition device can be greatly reduced.

According to a feature of the present invention, there is provided a two-substrate fingerprint recognition device, which includes a first substrate and a second substrate. A surface of the first substrate is provided with a plurality of electrodes, a plurality of conductive connection pads and a plurality of connection traces. A surface of the second substrate facing the first substrate is provided with a plurality of selecting switch circuits, a plurality of connection traces, a plurality of electrode connection pads and a plurality of conductive connection pads, wherein at least one electrode connection pad of the second substrate is electrically connected to a corresponding electrode of the first substrate.

DETAILED DESCRIPTION OF THE PREFERRED EMBODIMENT

Figure 1:
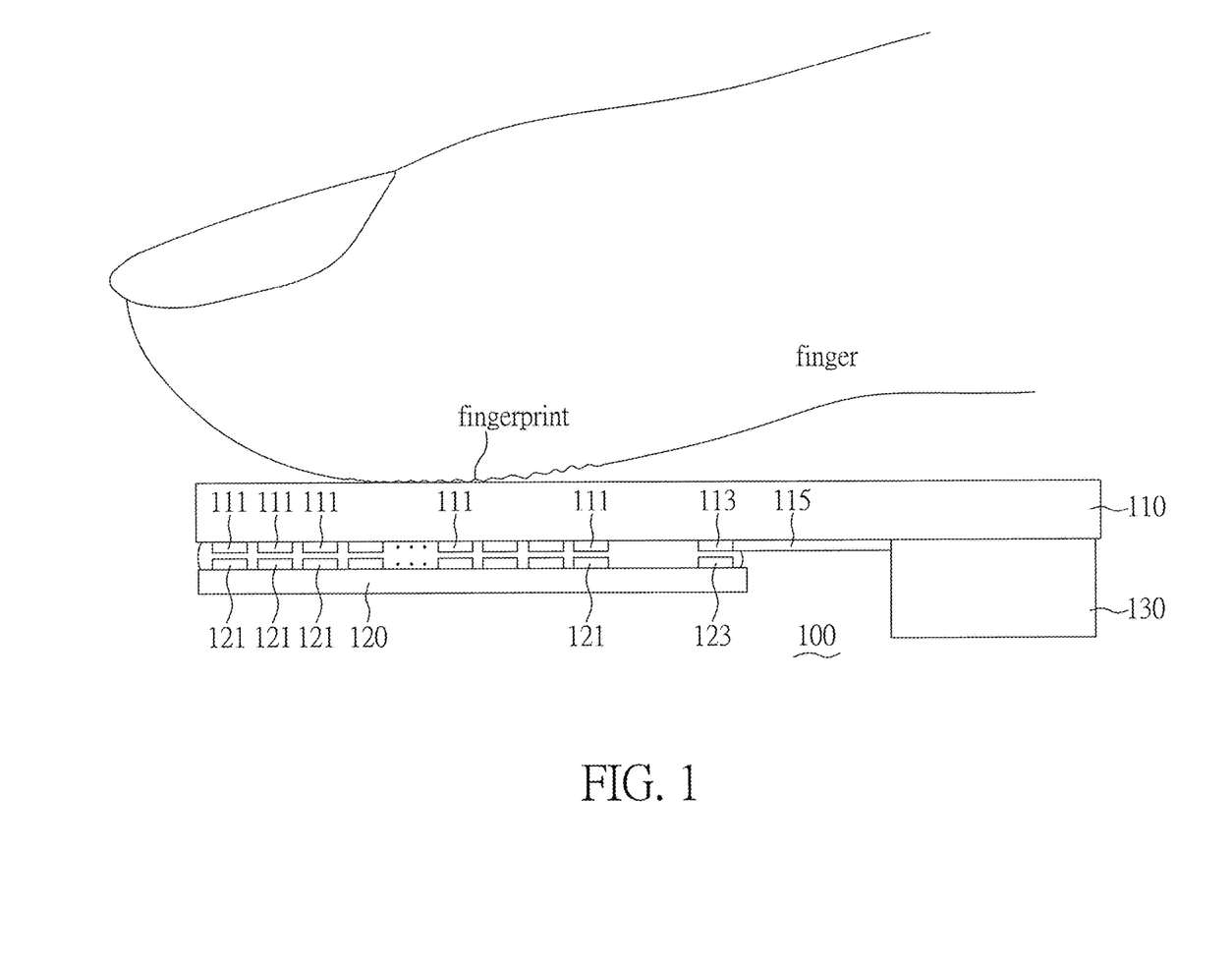
FIG. 1 is a cross-sectional view of the two-substrate fingerprint recognition device according to an embodiment of the present invention.
Figure 2:
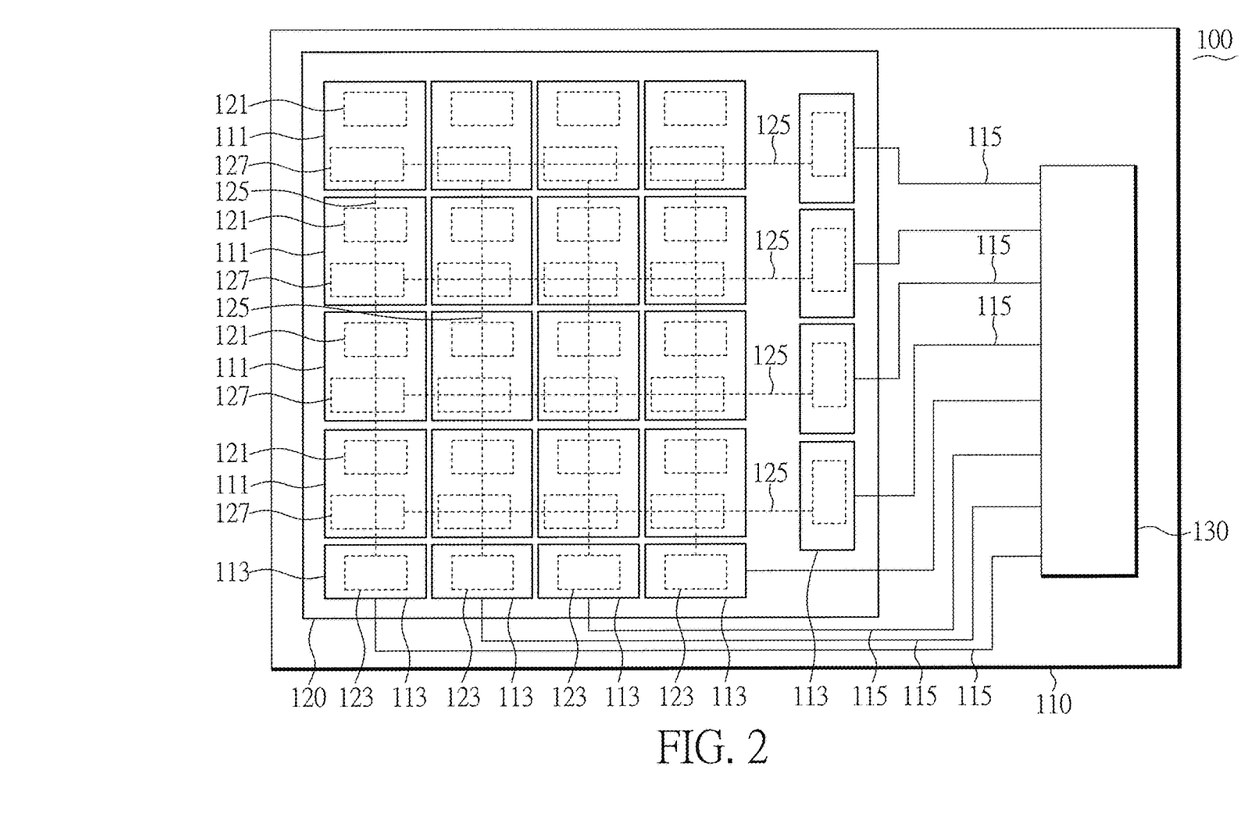
FIG. 2 is a top view of the two-substrate fingerprint recognition device according to an embodiment of the present invention.

FIG. 1 is a cross-sectional view of the two-substrate fingerprint recognition device 100 according to an embodiment of the present invention. FIG. 2 is a top view of the two-substrate fingerprint recognition device 100 according to an embodiment of the present invention. FIG. 2 is a schematic diagram when looking down along the finger. Please refer to FIG. 1 and FIG. 2, the two-substrate fingerprint recognition device 100 includes a first substrate 110, a second substrate 120 and a fingerprint sensing circuit 130. A surface of the first substrate 110 is provided with a plurality of electrodes 111, a plurality of conductive connection pads 113 and a plurality of connection traces 115. The first substrate 110 can be a glass substrate, a ceramic substrate, a sapphire substrate or a polymer material substrate. The plurality of electrodes 111, the plurality of conductive connection pads 113 and the plurality of connection traces 115 of the first substrate 110 can be made of opaque conductive metal materials or transparent conductive materials.

Since the FIG. 2 is a looking-down view, the second substrate 120 and the components thereon are shown by dotted lines. A surface facing the first substrate 110 of the second substrate 120 is provided with a plurality of electrode connection pads 121, a plurality of conductive connection pads 123, a plurality of connection traces 125 (only shown in FIG. 2) and a plurality of selecting switch circuits 127 (only shown in FIG. 2), wherein at least one electrode connection pad 121 of the second substrate 120 is electrically connected to a corresponding electrode 111 of the first substrate 110. The second substrate 120 can be a glass substrate, a ceramic substrate, a stainless steel substrate or a polymer material substrate. The area of each of the plurality of electrode connection pads 121 of the second substrate 120 is not larger than the area of the corresponding electrode 111 of the first substrate 110. The plurality of electrode connection pads 121, the plurality of conductive connection pads 123 and the plurality of connection traces 125 of the second substrate 120 are made of opaque conductive metal materials or transparent conductive materials.

At least one conductive connection pad 123 of the second substrate 120 is electrically connected to a conductive connection pad 113 of the first substrate, such that the control signals of the plurality of the selecting switch circuits 127 and the relevant fingerprint sensing signals of the fingerprint sensing circuit 130 are connected to the fingerprint sensing circuit 130 through the plurality of conductive connection pads 113 and the plurality of connection traces 125 of the first substrate 110. The plurality of the selecting switches 127 are thin film transistor switches or CMOS transistor switches.

As shown in FIG. 1, the fingerprint sensing circuit 130 is provided on the first substrate 110. In this case, the fingerprint sensing circuit 130 can be an integrated circuit in a package of a chip on glass (COG) or a chip on film (COF). The fingerprint sensing circuit 130 can be a self-capacitance sensing circuit. The first substrate 110 and the second substrate 120 are adhered to each other by an anisotropic conductive film (ACF), and electrical connections are generated between the electrode connection pads 121 of the second substrate 120 and the electrodes 111 of the first substrate 110, and between the conductive connection pads 123 of the second substrate 120 and the conductive connection pads 113 of the first substrate 110.

Figure 3:
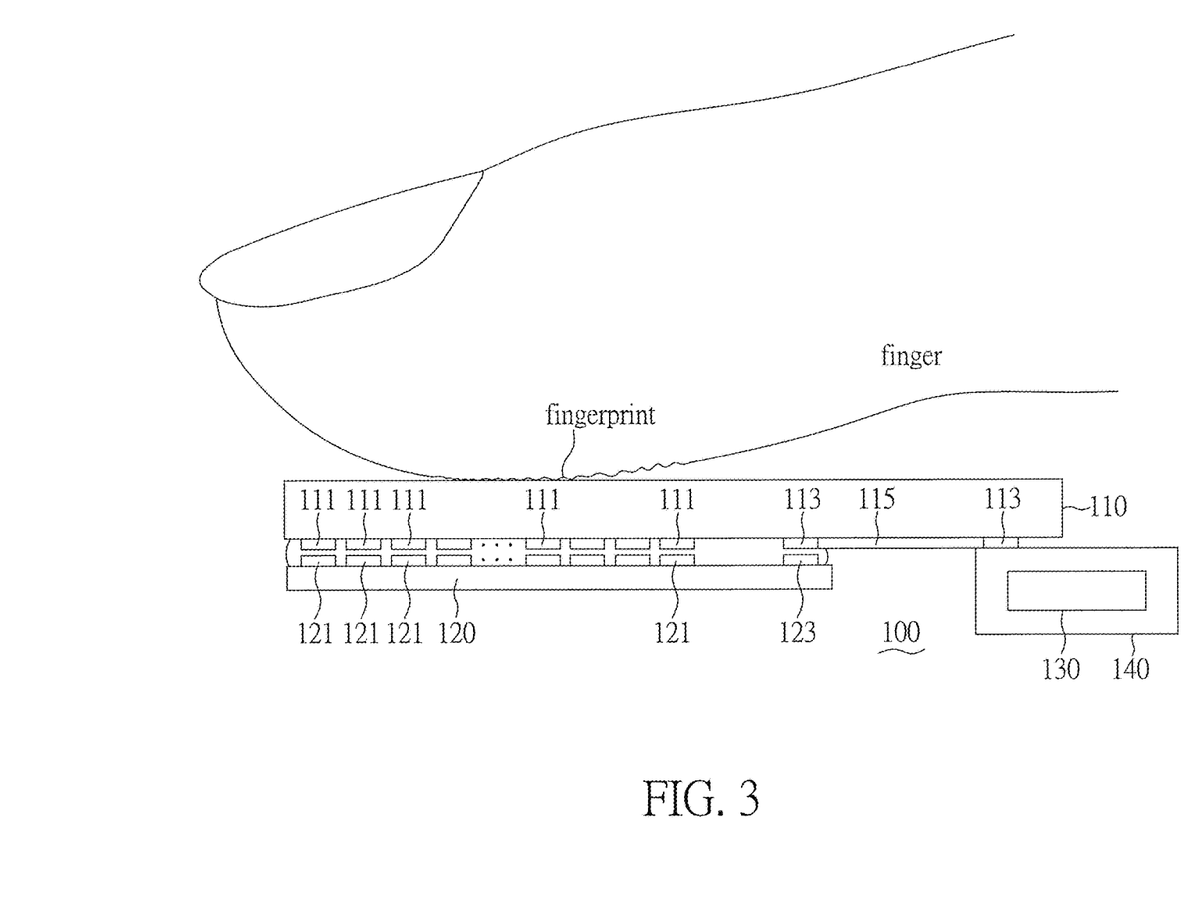
FIG. 3 is a cross-sectional view of the two-substrate fingerprint recognition device according to another embodiment of the present invention.
Figure 4:
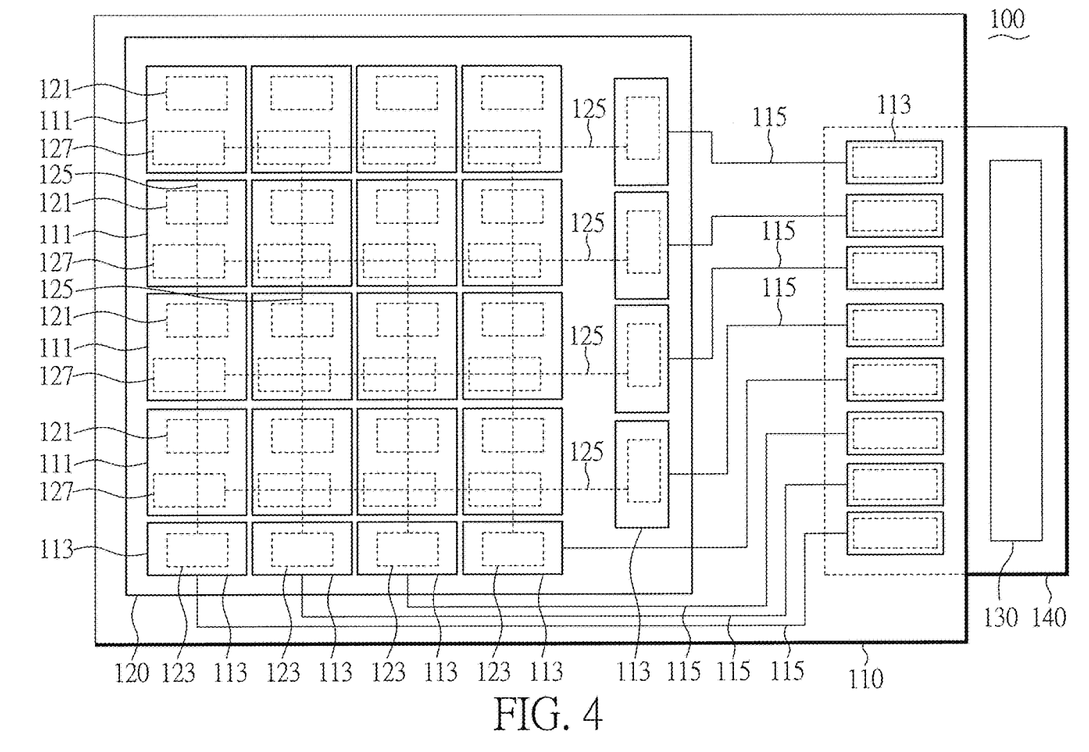
FIG. 4 is a top view of the two-substrate fingerprint recognition device according to another embodiment of the present invention.

FIG. 3 is a cross-sectional view of the two-substrate fingerprint recognition device 100 according to another embodiment of the present invention. FIG. 4 is a top view of the two-substrate fingerprint recognition device 100 according to another embodiment of the present invention. This embodiment is the same as that shown in FIGS. 1 and 2, except that at least one conductive connection pad 113 of the first substrate 110 is electrically connected to a flexible circuit board 140, the fingerprint sensing circuit 130 is provided on the flexible circuit board 140, and the flexible circuit board 140 is connected to the fingerprint sensing circuit 130.

Figure 5:
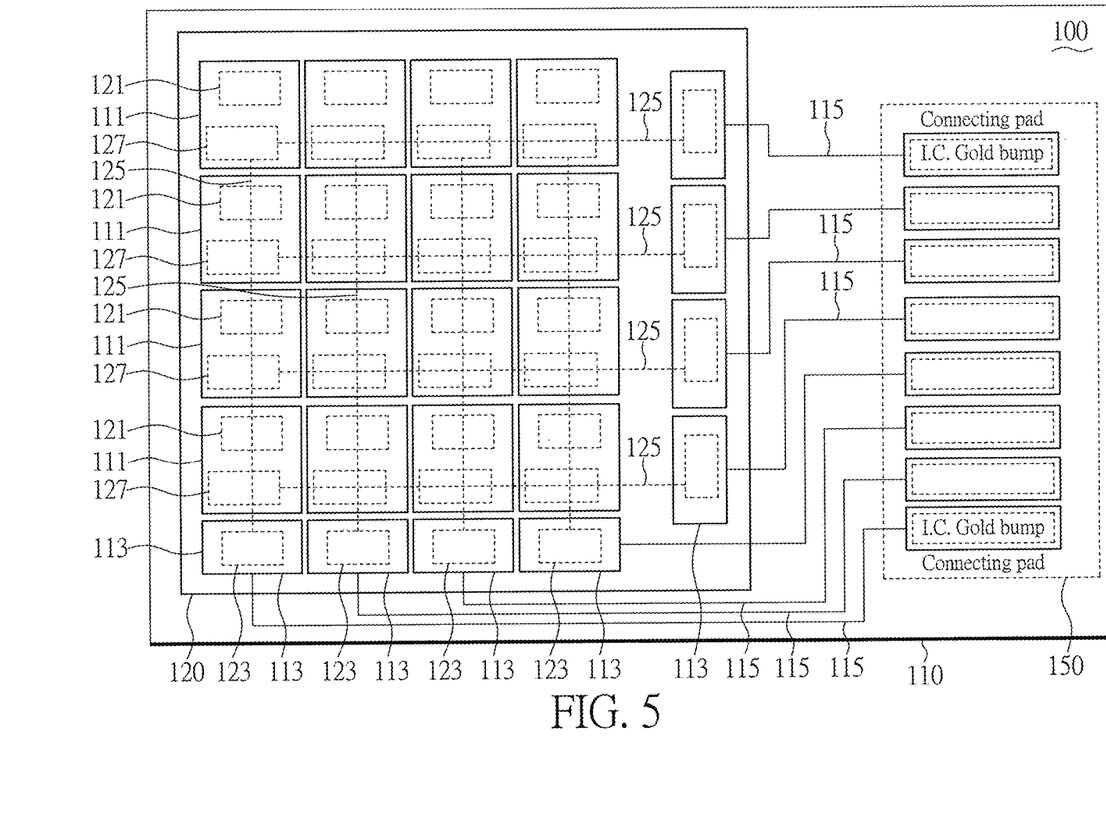
FIG. 5 is a top view of the two-substrate fingerprint recognition device according to still another embodiment of the present invention.

FIG. 5 is a top view of the two-substrate fingerprint recognition device 100 according to still another embodiment of the present invention. This embodiment is the same as that shown in FIGS. 1 and 2, except that at least one conductive connection pad 113 of the first substrate 110 is electrically connected to a flexible circuit board or a hard circuit board 150, and the fingerprint sensing circuit 130 is provided on the circuit board 150.

Figure 6:
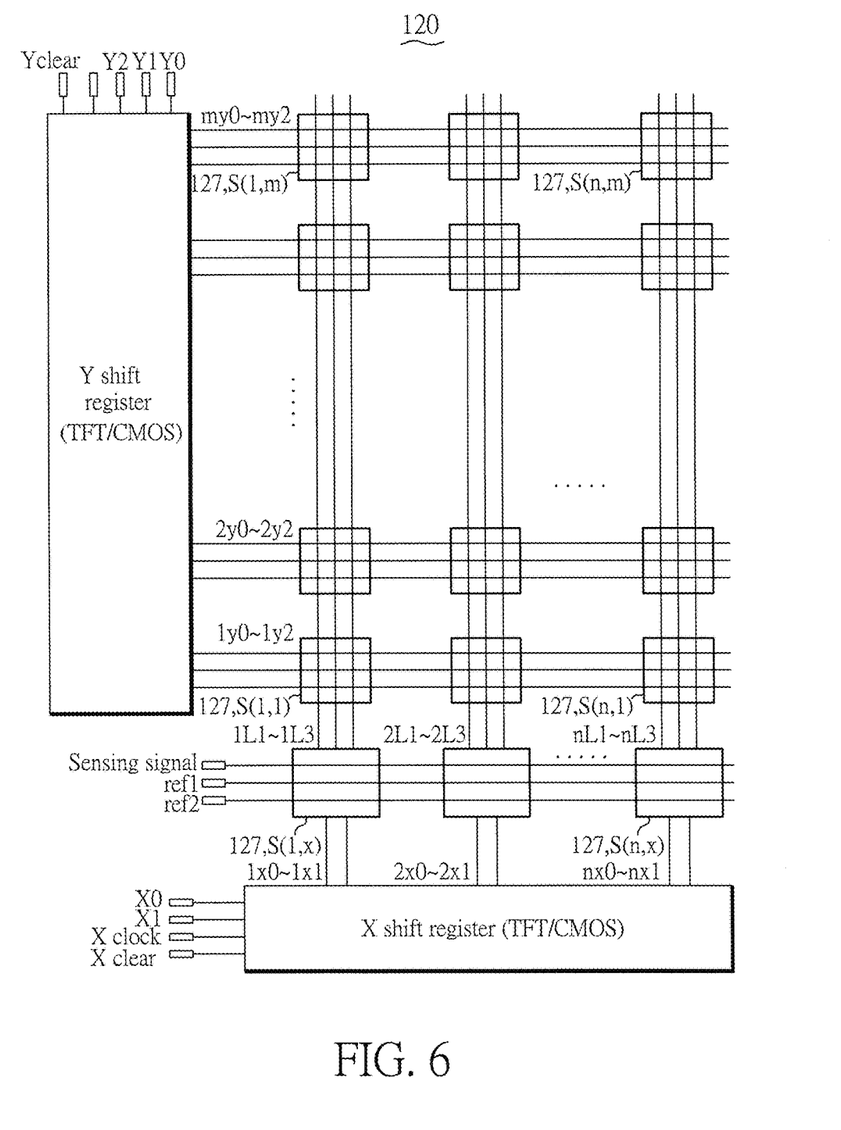
FIG. 6 is a schematic diagram of the second substrate and selecting switch circuits according to the present invention.

FIG. 6 is a schematic diagram of the second substrate 120 and the selecting switch circuits 127 according to the present invention. The electrode connection pads 121 corresponding to the selecting switch circuits 127 are electrically connected to the corresponding electrodes 111 on the first substrate 110. Thus, although FIG. 6 only shows the selecting switch circuits 127 $S(1,1) \sim S(n,m)$, it implies the combination of the selecting switch circuits 127, the corresponding electrode connection pads 121 and the corresponding electrodes 111.

As shown in FIG. 6, there are some selecting switch circuits 127 arranged in a matrix, represented by $S(1,1) \sim S(n,m)$ and some selecting switch circuits 127 arranged in a row, represented by $S(1,x) \sim S(n,x)$. The selecting switch circuits $S(1,1) \sim S(n,m)$ are arranged in a matrix. The plurality of the selecting switch circuit $S(1,x) \sim S(n,x)$ out of the matrix are arranged in a row. The selecting switch circuits $S(1,x) \sim S(n,x)$ are corresponding to the plurality of the selecting switch circuits $S(1,1) \sim S(n,m)$ in a column through a set of vertical lines (nL1~nLq), respectively. In FIG. 6, q is 3, which indicates that the selecting switch circuit $S(1,x)$ is corresponding to the plurality of the selecting switch circuits $S(1,1) \sim S(1,m)$ in a column through a set of vertical lines (1L1~1L3), the selecting switch circuit $S(2,x)$ is corresponding to the selecting switch circuits $S(2,1) \sim S(2,m)$ in a column through a set of vertical lines (2L1~2L3), and so on.

As shown in FIG. 6, horizontal lines 1y0~1yp, 2y0~2yp, . . . , my0~myp are used to control the switch circuits 127 in the corresponding row to be connected to which vertical line. In FIG. 6, p is 2. For example, the horizontal lines 1y0~1y2 are connected to the selecting switch circuits $S(1,1)$ . . . $S(n,1)$ and control them to be electrically connected to which vertical line. At the same time, control signals 1x0~1xi, 2x0~2xi, . . . , nx0~nxi control the selecting switch circuits $S(1,x)$ . . . $S(n,x)$, respectively, to select the vertical lines 1L1~1L3 to be connected to either the sensing signal or the deflection signals ref1, . . . , refk. In FIG. 6, i is 1, and k is 2. In other cases, the similar details are applied and a detailed description is deemed unnecessary.

Figure 7:
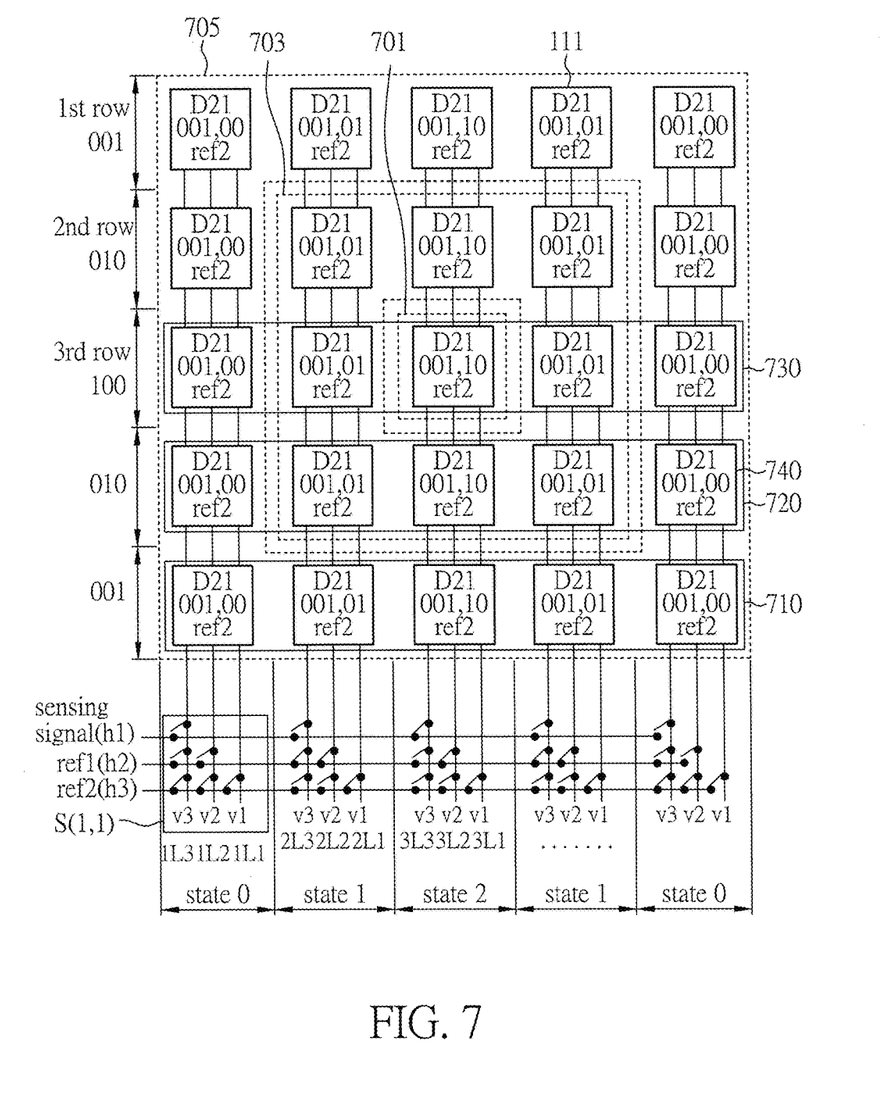
FIG. 7 is an operation diagram of the electrodes and the selecting switch circuits according to the present invention.

FIG. 7 is an operation diagram of the electrodes 111 and the selecting switch circuits 127 according to the present invention. In FIG. 7, D21, D11 and S11 represents the combination of the selecting switch circuits 127, the corresponding electrode connection pads 121 and the corresponding electrodes 111. Please Refer to FIG. 6 as well. The horizontal lines 1y0~1yp, 2y0~2yp, . . . , my0~myp are used to control the corresponding electrodes 111 in the corresponding row to be electrically connected to which vertical line. As shown in FIG. 7, for the 1st row's electrodes 710, the horizontal line signal is 001, which represents that the 1st row's electrodes 111 are electrically connected to the corresponding 1st vertical lines v1 (1L1, 2L1, . . . ), respectively. For the 2nd row's electrodes 720, the horizontal line signal is 010, which represents that the 2nd row's electrodes 111 are electrically connected to the corresponding 2nd vertical lines v2 (1L2, 2L2, . . . ), respectively. For the 3rd row's electrodes 730, the horizontal line signal is 100, which represents that the 3rd row's electrodes 111 are electrically connected to the corresponding 3rd vertical lines v3 (1L3, 2L3, . . . ), respectively.

In other words, the horizontal lines 1y0~1yp are 001, which represents that for the electrodes in that row, the 1st column's electrode 111 is electrically connected to the 1st vertical line 1L1, the 2nd column's electrode 111 is electrically connected to the 1st vertical line 2L1, and so on. The horizontal lines 1y0~1yp are 010, which represents that for the electrodes in that row, the 1st column's electrode 111 is electrically connected to the 2nd vertical line 1L2, the 2nd column electrode 111 is electrically connected to the 2nd vertical line 2L2, and so on. The horizontal lines 1y0~1yp are 100, which represents that for the electrodes in that row, the 1st column's electrode is electrically connected to the 3rd vertical line 1L3, the 2nd column electrode 111 is electrically connected to the 3rd vertical line 2L3, and so on.

The control signals 1x0~1xi, 2x0~2xi, . . . , nx0~nxi control the vertical lines 1L1~1Lq, 2L1~2Lq, . . . , nL1~nLq to be connected to either the sensing signal or the deflection signal ref1, relic. As shown in FIG. 6, the control signals 1x0~1xi, 2x0~2xi, . . . , nx0~nxi are each of two bits, which can establish four states. In the embodiment shown in FIG. 7, each set of the vertical lines 1L1~1Lq, 2L1~2Lq, . . . , nL1~nLq has only three italicize vertical lines v1, v2, v3 and three signal lines h1, h2, h3, so that it requires only three states, which are state 0, state 1 and state 2, respectively. The three signal lines h1, h2, h3 are corresponding to the sensing signal, the 1st deflection signal ref1 and the 2nd deflection signal ref2, respectively. The 1st column's three vertical lines v1, v2, v3 are corresponding to 1L1, 1L2, 1L3, respectively. The 2nd column's three vertical lines v1, v2, v3 are corresponding to 2L1, 2L2, 2L3, respectively. The n-th column's three vertical lines v1, v2, v3 are corresponding to nL1, nL2, nL3, respectively, and so on. Similar process is applied and thus a detailed description is deemed unnecessary.

The connection between the vertical lines and the signal lines is controlled by state 0, state 1 and state 2 through the selecting switch circuits 127. For state 0 (00b), the vertical line v1 is connected to the signal line h3, the vertical line v2 is connected to the signal line h3, and the vertical line v3 is connected to the signal line h3. For state 1 (01b), the vertical line v1 is connected to the signal line h3, the vertical line v2 is connected to the signal line h2, and the vertical line v3 is connected to the signal line h2. For state 2(10b), the vertical line v1 is connected to the signal line h3, the vertical line v2 is connected to the signal line h2, and the vertical line v3 is connected to the signal line h1.

With the aforementioned control, the 1st sensing electrode set 701 composed of the electrode denoted by S11 is connected to a sensing signal. The 1st deflection electrode set 703 composed of the electrodes denoted by D11 is connected to a 1st deflection signal ref1. The 2nd deflection electrode set 705 composed of the electrodes denoted by D21 is connected to a 2nd deflection signal ref2. The deflection signals ref1 and ref2 are the same signals, inverted signals, or other specific voltage signals as compared to the sensing signals on the sensing electrode set. The specific voltage signals can be a zero voltage, a positive voltage, a negative voltage or an AC signal.

There is a control code 010,00 for the electrode 740, wherein the first three bits, 010, represent that the electrode is electrically connected to the 2nd vertical line v2. If they are 001, it represents that the electrode is electrically connected to the 1st vertical line v1. If they are 100, it represents that the electrode is electrically connected to the 3rd vertical line v3. In other words, the first three bits in FIG. 7 use a one-hot encoding. The last two bits of the control code, 00, represent state 0. If they are 01, it represents state 1. If they are 10, it represents state 2.

Figure 8:
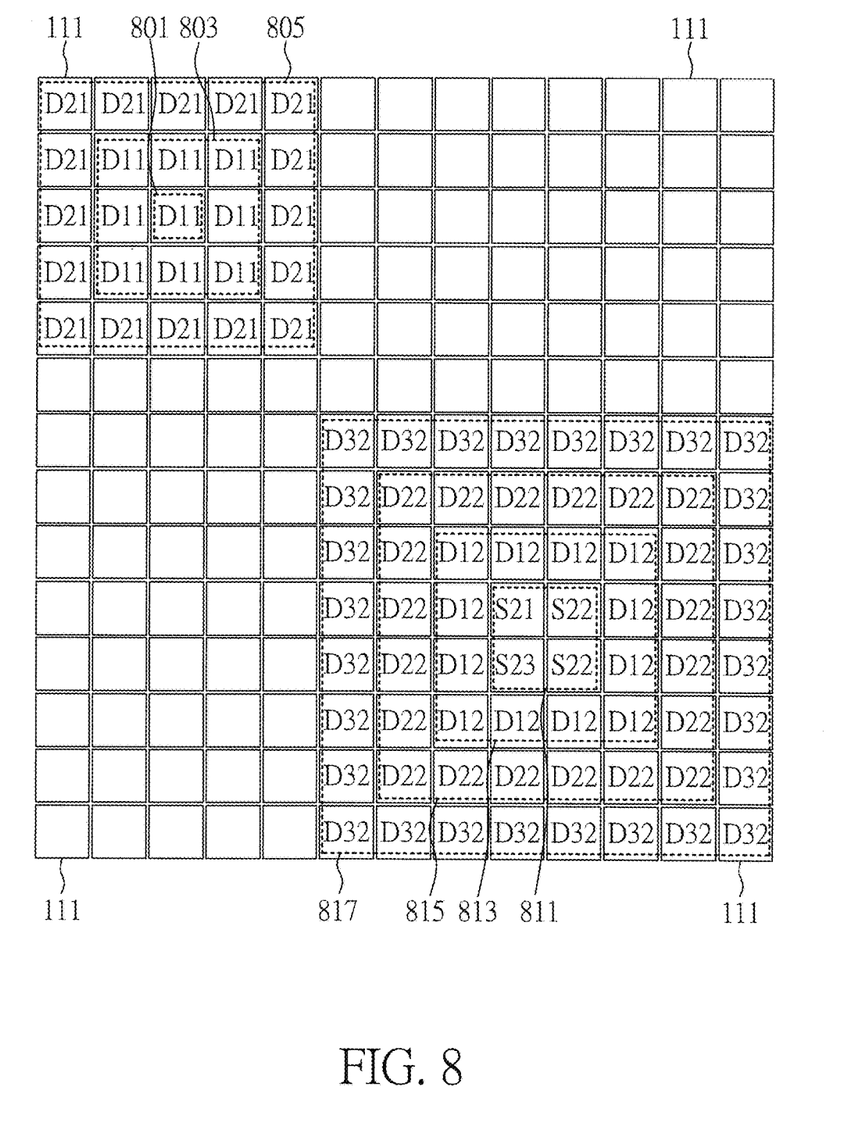
FIG. 8 is another operation diagram of the electrodes and the selecting switch circuit according to the present invention.

FIG. 8 is an operation diagram of the electrodes 111 and the selecting switch circuits 127 according to the present invention. As shown in FIG. 8, the plurality of electrodes 111 denoted by D11 around the 1st sensing electrode set 801 are combined into a 1st deflection electrode set 803 corresponding to the 1st sensing electrode set 801. The plurality of electrodes 111 denoted by D12 around the 2nd sensing electrode set 811 are combined into a 1st deflection electrode set 813 corresponding to the 2nd sensing electrode set 811. The plurality of electrodes 111 denoted by D21 around the 1st deflection electrode set 803 are combined into a corresponding 2nd deflection electrode set 805. The plurality of electrodes 111 denoted by D22 around the 1st deflection electrode set 813 are combined into a corresponding 2nd deflection electrode set 815. The plurality of electrodes 111 denoted by D32 around the 2nd deflection electrode set 815 are combined into a corresponding 3rd deflection electrode set 817.

In FIG. 8, the 2nd sensing electrode set 811 is composed of four electrodes S21, S22, S23, S24. The present invention employs a technology which uses the plurality of electrode connection pads 121 of the second substrate 120 and the plurality of the selecting switch circuits 127 to recombine the plurality of electrodes 111 on the first substrate 110 thereby forming a larger 1st sensing electrode set 801 and several deflection electrode sets. Thus, when performing fingerprint sensing operation, the plurality of electrodes 111 on the first substrate 110 can be configured to be sensing electrode sets applied with sensing signals, and corresponding several deflection electrode sets applied with the sensing-enhanced 1st deflection signal (ref1) or the sensing-reduced 2nd deflection signal (ref2). This can improve the sensing sensitivity and signal-to-noise ratio, and enhance the stability and the accuracy, while the cost of the fingerprint sensing device can be reduced.

Figure 9:
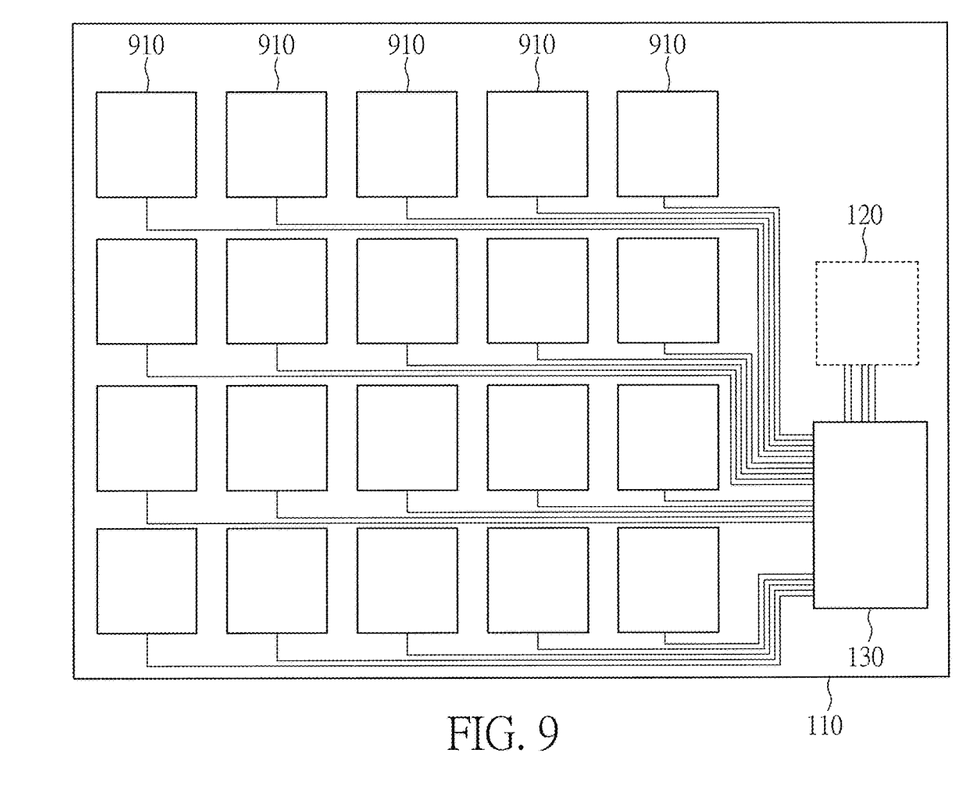
FIG. 9 is an application diagram of the two-substrate fingerprint recognition device according to the present invention.

FIG. 9 is an application diagram of the two-substrate fingerprint recognition device 100 according to the present invention. It is applicable in a touch display panel. The first substrate 110 can be a protection glass or a protection film of a display device. The first substrate 110 is further provided with a plurality of touch sensing electrodes 910. The fingerprint sensing circuit 130 has fingerprint recognition and touch functions. As shown in FIG. 9, the fingerprint sensing circuit 130 and the plurality of the touch sensing electrodes 910 can perform self-capacitance touch detection.

Figure 10:
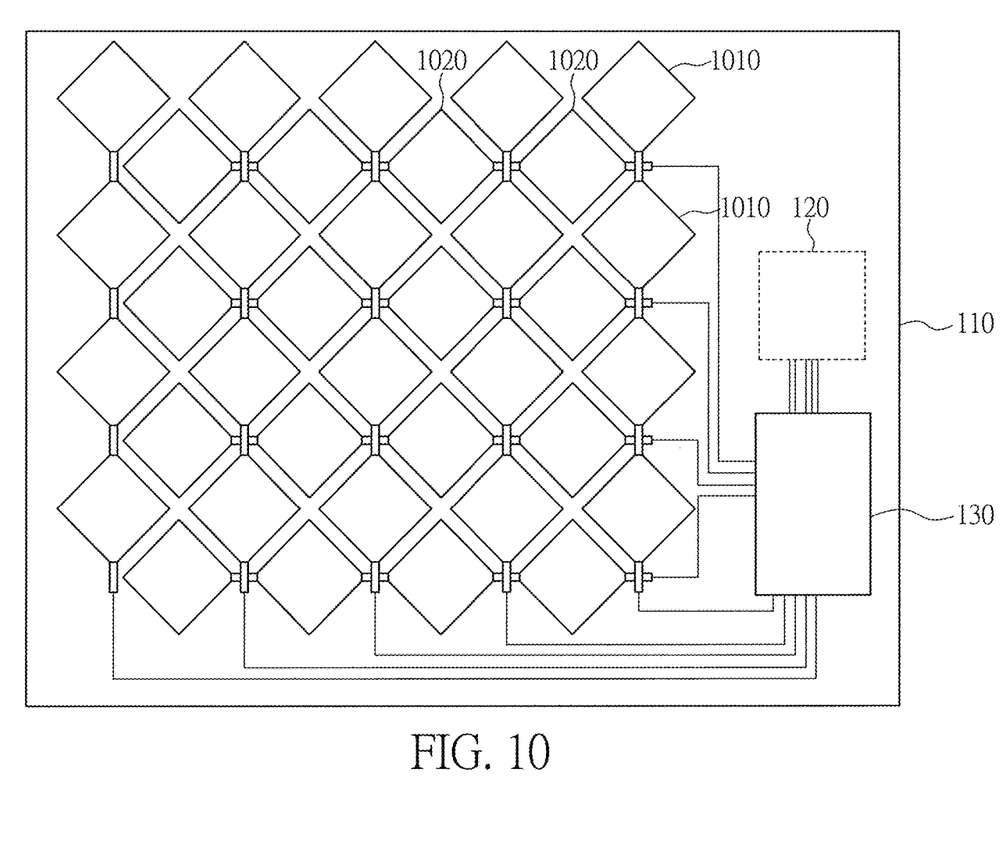
FIG. 10 is another application diagram of the two-substrate fingerprint recognition device according to the present invention.

FIG. 10 is another application diagram of the two-substrate fingerprint recognition device 100 of the present invention. It is applicable in a touch display panel. The first substrate 110 can be a protection glass or a protection film of a display device. The first substrate 110 is further provided with a plurality of touch sensing electrodes 1010 and 1020. The fingerprint sensing circuit 130 has fingerprint recognition and touch functions. As shown in FIG. 10, The plurality of touch sensing electrodes 1010 are connected to each other by bridges along the direction of column, so as to form touch sensing electrodes arranged in rows, while the plurality of touch sensing electrodes 1020 are connected to each other by bridges along the direction of row, so as to form touch sensing electrode arranged in columns. The fingerprint sensing circuit 130, the touch sensing electrodes in rows and the touch sensing electrodes in columns can perform mutual-capacitance touch detection.

Figure 11:
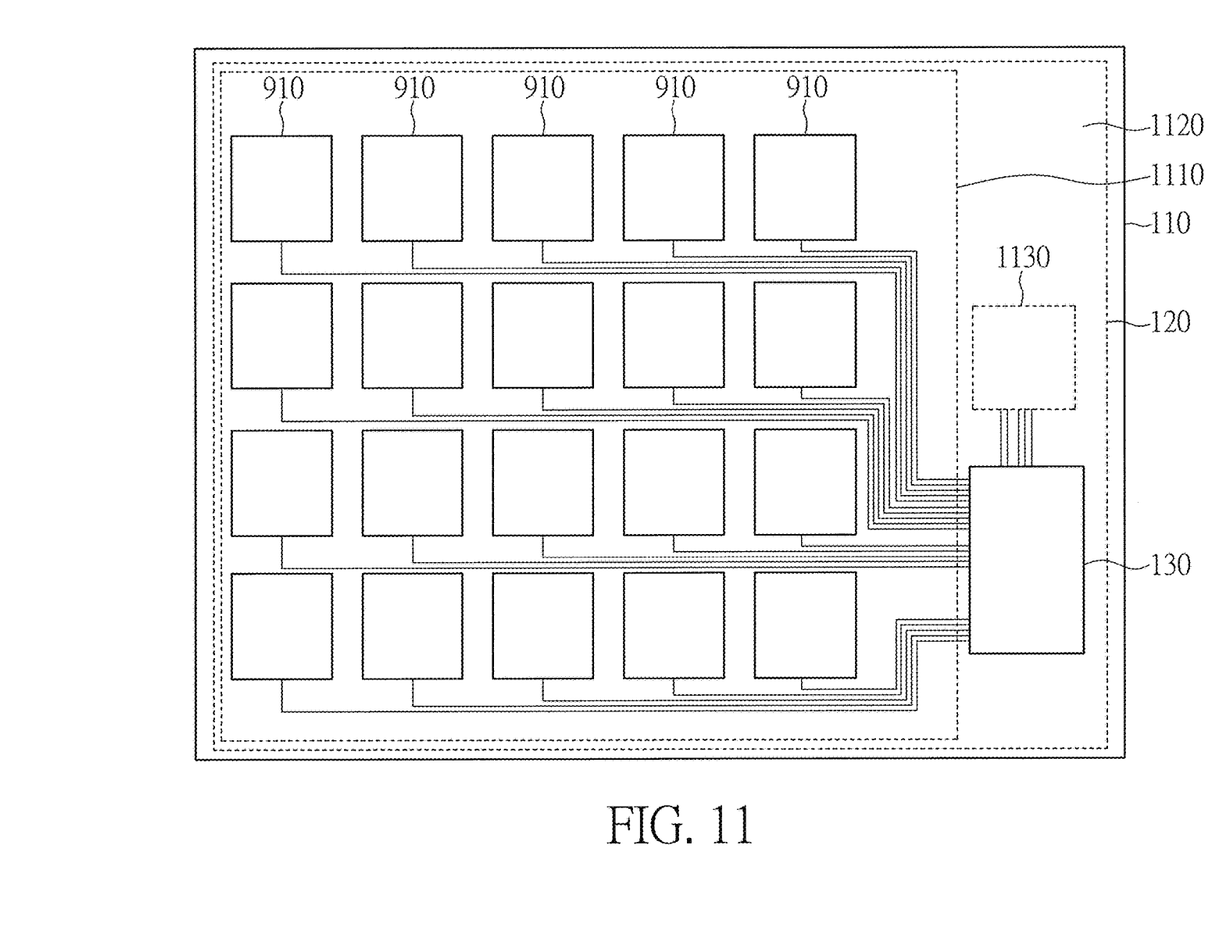
FIG. 11 is still another application diagram of the two-substrate fingerprint recognition device according to the present invention.

FIG. 11 is still another application diagram of the two-substrate fingerprint recognition device 100 according to the present invention. It is an embodiment applicable in a touch display panel. It integrates the fingerprint recognition electrodes on a prior self-capacitance touch electrode substrate, and the touch circuit and the fingerprint recognition circuit are integrated into an integrated circuit chip 130, wherein the first substrate 110 can be a protection glass or a protection film of a display device, the first substrate 110 is further provided with a plurality of touch sensing electrodes 910, and the fingerprint sensing circuit 130 has fingerprint recognition and touch functions. The plurality of the selecting switches 127 on the second substrate 120 can be produced by the thin film transistor (TFT) manufacturing process for a liquid crystal panel, so that the plurality of the selecting switches 127 can be thin film transistor switches or CMOS transistor switches.

A touch display panel can be divided into an active area 1110 and a non-active area 1120. The plurality of electrodes 111, the plurality of conductive connection pads 113 and the plurality of connection traces 115 of the first substrate 110, the plurality of electrode connection pads 121, the plurality of conductive connection pads 123 and the plurality of connection traces 125 of the second substrate 120, and the plurality of selecting switch circuits 127 can be deployed in the region 1130 in the non-active area 1120, and the fingerprint sensing circuit 130 can be deployed in the non-active area 1120. This will not disturb the display and touch functions of the touch display panel.

As described above, the present invention employs a technology which uses a plurality of electrode connection pads 121 of the second substrate 120 and a plurality of selecting switch circuits 127 to recombine the plurality of electrodes 111 on the first substrate 110 for forming a larger 1st sensing electrode set 801 and several deflection electrode sets. Thus, when performing fingerprint sensing operation, the plurality of electrodes 111 on the first substrate 110 can be configured to be sensing electrode sets applied with sensing signals, and corresponding several deflection electrode sets applied with the sensing-enhanced 1st deflection signal (ref1) or the sensing-reduced 2nd deflection signal (ref2). This can improve the sensing sensitivity and the signal-to-noise ratio, and enhance the stability and the accuracy. Thus, although the electrodes are deployed on a protection glass or a protection film, they can accurately sense the fingerprint sensing signals. As a result, it is unnecessary to use a sapphire substrate with high dielectric constant for protection. On the other hand, the two-substrate fingerprint recognition device of the present invention can be integrated into a prior touch display panel by a typical touch display panel manufacturing process. It is unnecessary to produce the sensing electrodes with an expensive CMOS integrated circuit manufacturing process. Thus, the area of the sensing circuit is minimized, the package manufacturing process is simplified, and the cost of the fingerprint sensing device can be reduced.

The aforementioned embodiments are only examples for description. The claimed scope of the present invention is accorded to the claims, not limited to the aforementioned embodiments.

What is claimed is:

1. A two-substrate fingerprint recognition device, comprising:
   a first substrate having a surface provided with a plurality of electrodes, a plurality of conductive connection pads and a plurality of connection traces;
   a second substrate having a surface facing the first substrate and provided with a plurality of selecting switch circuits, a plurality of connection traces, a plurality of electrode connection pads and a plurality of conductive connection pads, wherein at least one electrode connection pad of the second substrate is electrically connected to a corresponding electrode of the first substrate; and
   a fingerprint sensing circuit, wherein at least one conductive connection pad of the second substrate is electrically connected to a conductive connection pad of the first substrate, such that control signals of the plurality of selecting switch circuits and relevant fingerprint sensing signals of the fingerprint sensing circuit are connected to the fingerprint sensing circuit through the plurality of conductive connection pads and the plurality of connection traces of the first substrate.

2. The two-substrate fingerprint recognition device as claimed in claim 1, wherein the plurality of selecting switches are thin film transistor switches or CMOS transistor switches.

3. The two-substrate fingerprint recognition device as claimed in claim 1, wherein the fingerprint sensing circuit is provided on the first substrate.

4. The two-substrate fingerprint recognition device as claimed in claim 1, wherein the fingerprint sensing circuit is a self-capacitance sensing circuit.

5. The two-substrate fingerprint recognition device as claimed in claim 1, wherein at least one conductive connection pad of the first substrate is electrically connected to a flexible circuit board or a hard circuit board, and a fingerprint sensing circuit is provided on the circuit board.

6. The two-substrate fingerprint recognition device as claimed in claim 1, wherein at least one conductive connection pad of the first substrate is electrically connected to a flexible circuit board, and the flexible circuit board is connected to a fingerprint sensing circuit.

7. The two-substrate fingerprint recognition device as claimed in claim 1, wherein the first substrate is a region of a protection glass or a protection film of a display device.

8. The two-substrate fingerprint recognition device as claimed in claim 1, wherein the fingerprint sensing circuit has fingerprint recognition and touch functions, and the first substrate is further provided with a plurality of touch sensing electrodes.

9. The two-substrate fingerprint recognition device as claimed in claim 1, wherein the first substrate is a glass substrate, a ceramic substrate, a sapphire substrate or a polymer material substrate.

10. The two-substrate fingerprint recognition device as claimed in claim 1, wherein the second substrate is a glass substrate, a ceramic substrate, a stainless steel substrate or a polymer material substrate.

11. The two-substrate fingerprint recognition device as claimed in claim 1, wherein each of the plurality of electrode connection pads of the second substrate has an area not larger than that of the corresponding electrode of the first substrate.

12. The two-substrate fingerprint recognition device as claimed in claim 1, wherein the plurality of electrodes, the plurality of conductive connection pads and the plurality of connection traces of the first substrate are made of opaque conductive metal materials or transparent conductive materials.

13. The two-substrate fingerprint recognition device as claimed in claim 1, wherein the plurality of electrode connection pads, the plurality of conductive connection pads and the plurality of connection traces of the second substrate are made of opaque conductive metal materials or transparent conductive materials.

14. The two-substrate fingerprint recognition device as claimed in claim 1, wherein the first substrate and the second substrate are adhered to each other by an anisotropic conductive film (ACF), and electrical connections are generated between the electrode connection pad of the second substrate and the electrode of the first substrate, and between the conductive connection pad of the second substrate and the conductive connection pad of the first substrate.

* * * * *